US006671237B1

(12) United States Patent
Soo

(10) Patent No.: US 6,671,237 B1
(45) Date of Patent: Dec. 30, 2003

(54) METHOD AND APPARATUS FOR DRIVING AN ELECTRO-OPTIC MODULATOR ASSEMBLY

(75) Inventor: Daniel Soo, Sedalia, CO (US)

(73) Assignee: Imation Corp., Oakdale, MN (US)

( * ) Notice: Subject to any disclaimer, the term of this patent is extended or adjusted under 35 U.S.C. 154(b) by 456 days.

(21) Appl. No.: 09/796,327

(22) Filed: Feb. 28, 2001

Related U.S. Application Data

(60) Provisional application No. 60/185,817, filed on Feb. 29, 2000.

(51) Int. Cl.[7] ................................................. G11B 7/00
(52) U.S. Cl. ........................... 369/44.23; 369/112.27; 369/112.02; 359/237; 359/245; 359/215
(58) Field of Search ................... 369/44.23, 44.13, 369/47.19, 107, 112.01, 112.02, 112.1, 112.15, 112.16, 112.17, 112.22, 112.27, 124.04; 359/237, 238, 245, 246, 251, 254, 255, 276–279, 281, 283, 298–305, 315, 322, 323

(56) References Cited

U.S. PATENT DOCUMENTS

| | | | | |
|---|---|---|---|---|
| 5,831,759 A | * | 11/1998 | Debesis et al. | 359/254 |
| 6,115,345 A | * | 9/2000 | Kato et al. | 369/112.1 |
| 6,141,301 A | | 10/2000 | Oakley | |
| 6,483,624 B1 | * | 11/2002 | Otani et al. | 398/201 |
| 6,545,968 B1 | * | 4/2003 | Oakley | 369/95 |
| 6,597,487 B2 | * | 7/2003 | Hutchinson et al. | 359/237 |

\* cited by examiner

Primary Examiner—Thang V. Tran
(74) Attorney, Agent, or Firm—Eric D. Levinson

(57) ABSTRACT

An electro-optic modulator is driven between discrete operating points such that a reversal of applied field polarity reduces harmful charge screening effects and the voltage swing between the operating points is reduced from previously used voltage swings.

34 Claims, 9 Drawing Sheets

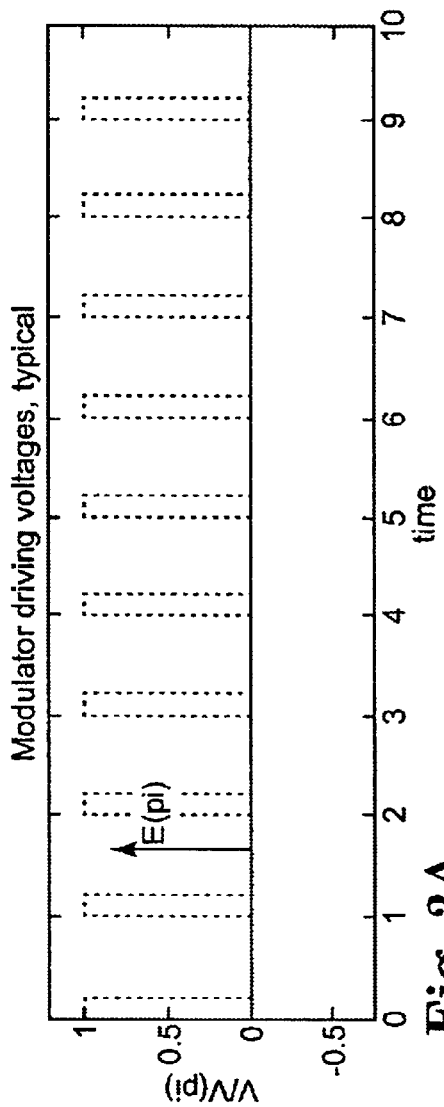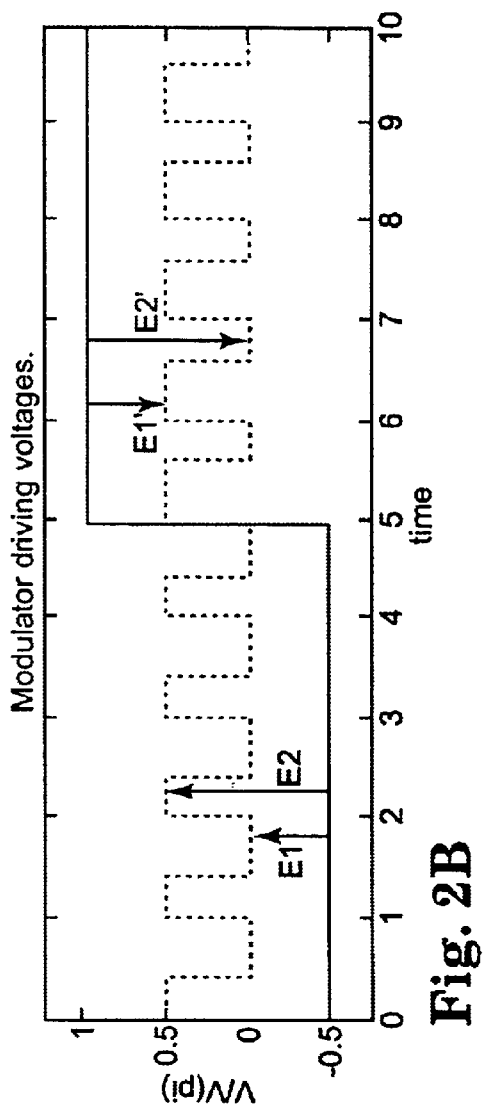

METHOD AND APPARATUS FOR DRIVING AN ELECTRO-OPTIC MODULATOR ASSEMBLY

CLAIM OF DOMESTIC PRIORITY UNDER 35 U.S.C. §119(e)

This application claims benefit of priority to previously filed provisional application No. 60/185,817, filed on Feb. 29, 2000. The contents of provisional application No. 60/185,817 are incorporated by reference herein to the extent that material from the provisional application is not already included in the present application.

BACKGROUND OF THE INVENTION

1. Field of the Invention

The present invention pertains to optical modulators. Moreover, the present invention pertains to operation and construction of such modulators, and the use of such modulators in optical media recording devices.

2. Description of the Related Art

In an electro-optic modulator, the index of refraction of the electro-optic material changes with an externally applied voltage along the direction of the electric field. Thus, when the external electric field is on, the index of refraction along the field lines has a different value than the index of refraction perpendicular to the field lines. In a transverse electro-optic modulator, a light beam traverses the modulator in a direction perpendicular to the external electric field while its polarization is both planar and is at 45 degrees to the external electric field. Inside the electro-optic material, the light beam polarization is broken into two components along the two indices of refraction. The polarization component that is parallel to the external electric field will traverse the length of the electro-optic material either faster or slower than the other orthogonal polarization component depending on the sign of the index of refraction change. If the modulated index of refraction is smaller than the unmodulated one, then the polarization component along the modulated axis advances relative to the unmodulated polarization axis. The modulation voltage that causes a 180 degrees phase difference between the two orthogonal polarizations of the light beam is called the pi voltage ($V\pi$). At $V\pi$, the modulator acts as a half-wave retarder. In other words, an incident light beam polarization at 45 degrees to the external electric field will be rotated by 90 degrees from its initial orientation upon exiting the electro-optic modulator. The modulator becomes an on/off switchable optical device by placing a polarizer after the electro-optic modulator with its polarization axis 90 degrees to the initial orientation of the light beam polarization. With the modulator in the "off" position (no voltage applied) no light passes through the polarizer. With the modulator in the "on" position ($V\pi$ applied), the light beam passes through the polarizer. These materials have other properties: they have a very large dielectric constant, they can be electrically lossy, and they can exhibit some charge screening.

In a transverse electro-optic modulator, one electrode is typically driven to a high voltage at a low duty cycle and the other electrode is grounded. The electric field at which the phases of orthogonal polarizations vary by half a wavelength is called E(pi) and is calculated by dividing Vn by the distance between the electrodes.

Some applications require 100% optical response, and drive the modulator between 0 and +E(pi). For example, as shown in FIG. 1, a typical modulator drive range for such applications is between 0 and +E(pi).

SUMMARY OF THE INVENTION

An electro-optic modulator is driven between discrete operating points such that a reversal of applied field polarity reduces harmful charge screening effects and the voltage swing between the operating points is reduced from previously used voltage swings.

BRIEF DESCRIPTION OF THE DRAWINGS

The present invention is illustrated by way of example and not limitation in the accompanying figures.

FIG. 2A is a graph showing typical modulator driving voltages in relation to time.

FIG. 2B is a graph showing modulator driving voltages in relation to time in accordance with the teachings of the present invention.

DETAILED DESCRIPTION

A method and apparatus for driving an electro-optic modulator assembly is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Reference is repeatedly made in the specification to the term modulator. Typically, the term modulator refers to the electro-optic material through which the light passes and is retarded. However, one skilled in the art will recognize that in some instances, the term modulator refers to a more encompassing group of components, such as electrodes used to produce an electric field, a polarizer, a voltage source or sources, or other components in conjunction with the retarding material. Such a group of components may be referred to as a modulator assembly, too.

Figure 1:
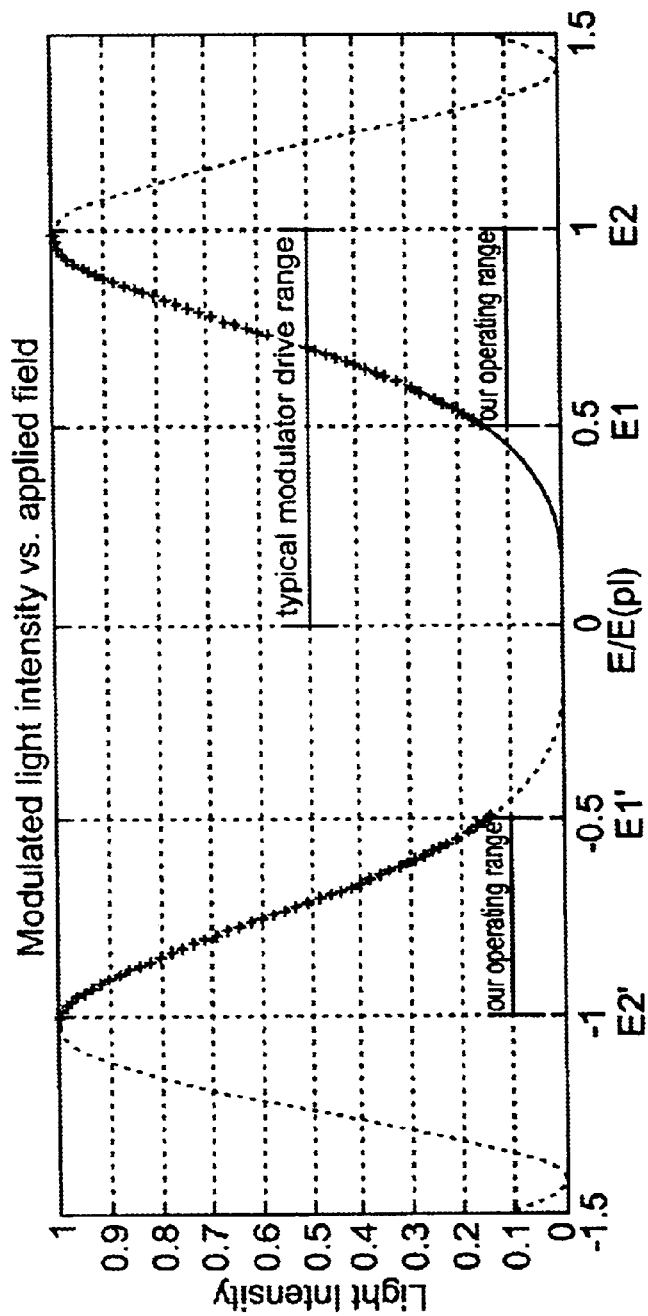
FIG. 1 is a graph showing modulated light intensity in relation to an applied electric field.

Achieving 100% optical response is not always necessary and may not even be desirable. Thus, a useful optical intensity variation (e.g. 15%–100%) can be achieved by driving the modulator from E1 to E2 and from E1' to E2', where E1, –E1', and E(pi)/2 are approximately equal, and E2, –E2', and E(pi) are approximately equal. For example, as shown in FIG. 1, exemplary operating ranges according to the present invention exist between E1 and E2 and between E1' and E2'.

The modulator is adequately driven from E1 to E2 and from E1' to E2' by applying the voltages VA and VB on the electrodes A and B. The voltage VA is shown with the dotted line in FIG. 2A, and the voltage VB is the solid line in FIG. 2B. This reversal of applied field polarity reduces the harmful charge screening effect mentioned above. Further, the reversal of applied polarity can be performed at a much lower rate than our primary modulation frequency. This reduction in rate of large voltage swings reduces the power required to drive the modulator as well as the power dissipated in the lossy modulator material.

The modulator may suffer from problems due to heat, as the lossy modulator material tends to heat up during operation. The modulator essentially behaves like a capacitor with a lossy dielectric which tends to heat up due to energy input involved in turning the electric field on and off or varying the intensity of the electric field. The temperature operating point of the modulator is thus based on heat dissipation, light throughput, charge screening, and efficiency, all of which tend to change with temperature. Similarly, $E(\pi)$ tends to vary with temperature, but it varies such that determining a suitable $E(\pi)$ in laboratory experiments may be sufficient to produce a manufacturable product. Thus, a desired or expected temperature operating point may be chosen and an $E(\pi)$ measured for that operating point. Charge screening has been shown to eventually cause the electro-optic material to stop responding to an applied electric field, so avoiding that problem by periodically changing the polarity or direction of the electric field may be useful. In the case of materials exhibiting a quadratic (or similarly steep) response to an electric field, the materials may exhibit useful characteristics even though the electric field is not switched between the half wave retardation level and a zero field level. Note that the material used determines what electric field is sufficient, and thus the voltages necessary to generate the electric field.

Figure 3:
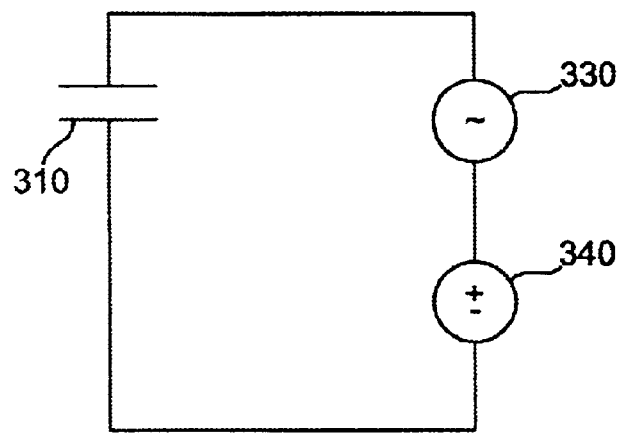
FIG. 3 illustrates a block diagram or schematic of an embodiment of an electro-optic modulator.

Turning to FIG. 3, a block diagram or schematic of an embodiment of an electro-optic modulator is illustrated. Capacitor 310 corresponds to an electro-optic modulator. Voltage source 330 is a small signal voltage source, typically operating at a relatively high frequency and across a relatively small voltage range. Voltage source 340 is a bias voltage source, typically operating over a relatively larger voltage range at a relatively lower frequency than that of voltage source 330. Thus, the voltage differential applied to the capacity 310 (or an electro-optic modulator) may be varied according to the voltages generated by sources 330 and 340.

Figure 4:
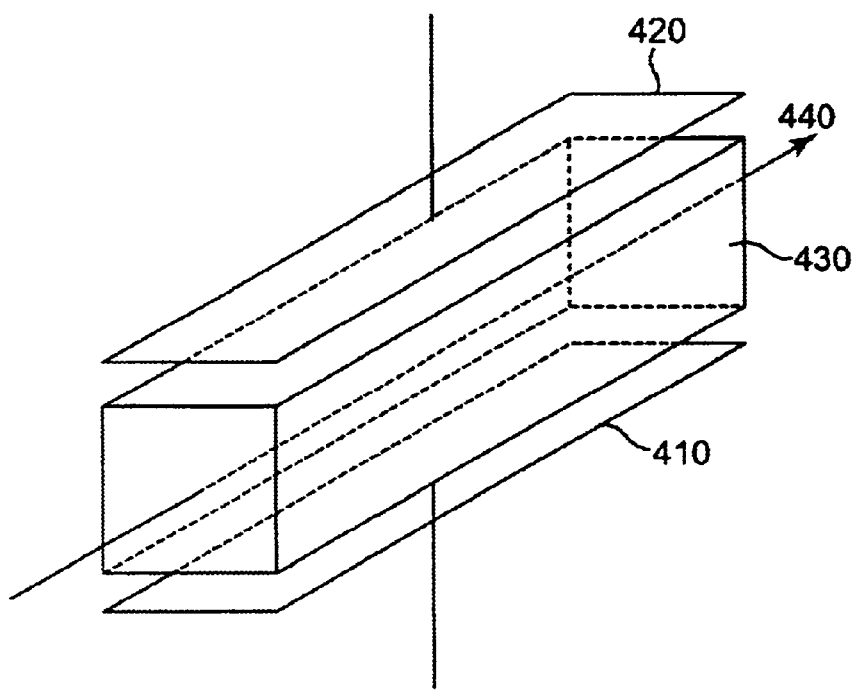
FIG. 4 illustrates a view of an embodiment of an electro-optic modulator.

Turning to FIG. 4, a view of an embodiment of an electro-optic modulator is illustrated. First electrode 410 and second electrode 420 are coupled to electro-optic material 430. Electrode 410 is coupled to a first side of material 430 and electrode 420 is coupled to a second side of material 430. Preferably, the first side and the second side are opposite each other, allowing for generation of an electric field across the entirety of material 430. Light ray 440 is illustrated passing through material 430, entering at a third side and exiting at a fourth side.

In one embodiment, material 430 may act as a half wave retarder, depending on the electric field applied to material 430. If the light ray 440 is then passed through a polarizer having an axis set at an appropriate angle, the light ray will either pass through the polarizer or not pass through depending on the retardation occurring in the material 430. Several materials suitable for use as material 430 are known. Those having retardation curves similar to the curve of FIG. 1 include PLZT, lithium tantalate, lithium niobate, and KDKP. Note that the curve of FIG. 1 assumes both retardation and passage through a polarizer. The associated retardation has a quadratic or nearly quadratic relationship to the applied electric field, and may be graphed in a graph similar to that of FIG. 1.

Figure 5A:
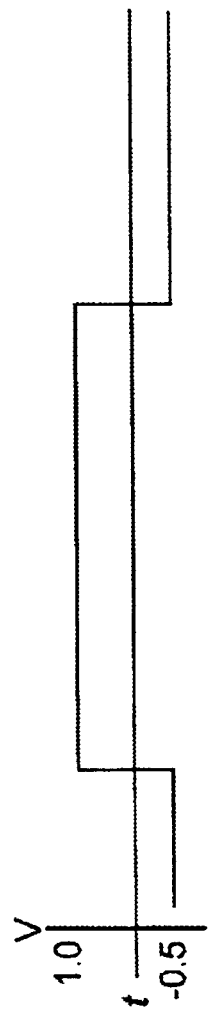
FIG. 5A illustrates an embodiment of a signal.
Figure 5B:
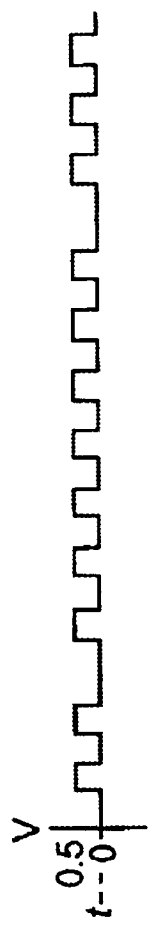
FIG. 5B illustrates an embodiment of a signal.

FIG. 5A illustrates an embodiment of a signal. Such a signal may be suitable for the large signal voltage associated with source 340 of FIG. 3. The signal varies between a half wave retardation voltage and a negative voltage having a magnitude one half of the half wave retardation voltage. Furthermore, the frequency of this variation is relatively low. FIG. 5B illustrates an embodiment of a signal. Such a signal may be suitable for the small signal voltage associated with source 330 of FIG. 3. The signal varies between ground and one half of the half wave retardation voltage. The frequency of this signal is relatively high. Note, in one embodiment, the signal of FIG. 5A is applied to the first side of the material 430 of FIG. 4 and the signal of FIG. 5B is applied to the second side of the material 430 of FIG. 4.

Figure 5C:
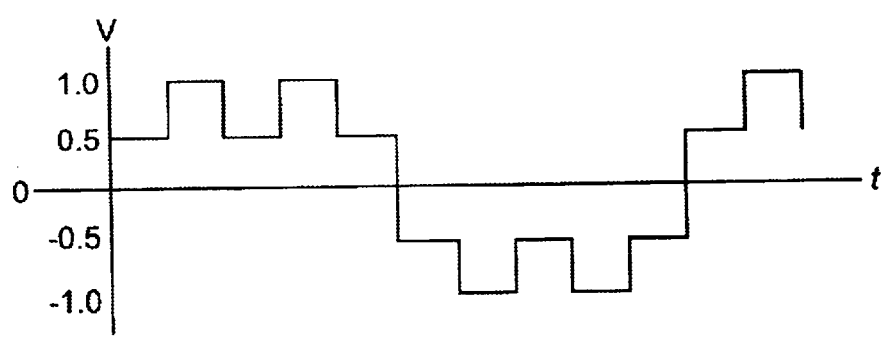
FIG. 5C illustrates an embodiment of a signal.

FIG. 5C illustrates an embodiment of a signal. The signal of FIG. 5C may be obtained by subtracting the signals of FIGS. 5A and 5B (using the differential between the two voltages). This signal may be applied as a voltage differential across the capacitor 310 of FIG. 3, which is essentially the electro-optic modulator. Thus, the polarity of the applied voltage is reversed from time to time, and the differential voltage is varied at a higher frequency. Preferably, the corresponding electric field is similar to that illustrated in FIG. 1, and the voltages applied are determined based on the actual properties of the material used in the modulator. However, it will be appreciated that for materials having the quadratic relationship illustrated, the predetermined minimal retardation voltage level will be approximately one half of the half wave retardation voltage level.

The predetermined minimal retardation voltage level will result in an electric field which causes some retardation of light passing through the material, but not enough to diminish the amount of light which may pass through a polarizer too drastically. The amount of 15% is mentioned with respect to FIG. 1, and that may be adequate in some applications, where the difference between diminishing transmitted light by 15% and diminishing transmitted light by 100% is sufficient. Other applications may be found in which the amount of light transmitted may vary between other ranges which allow for a narrower or slightly wider voltage swing while still taking advantage of the quadratic nature of the material used in the modulator.

Figure 5D:
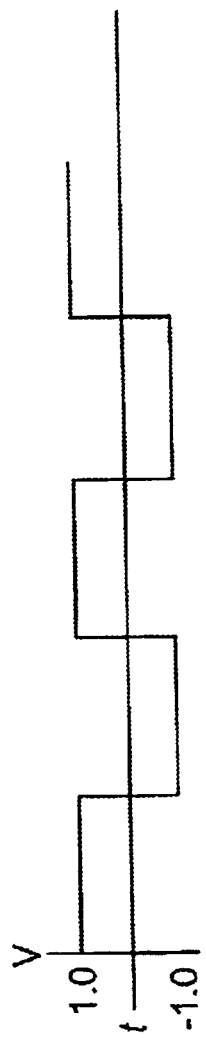
FIG. 5D illustrates an embodiment of a signal.
Figure 5E:
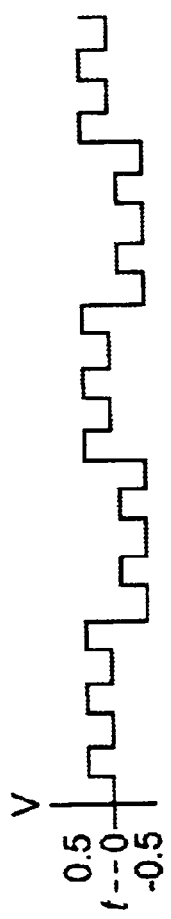
FIG. 5E illustrates an embodiment of a signal.

FIG. 5D illustrates an embodiment of a signal. Such a signal may be suitable for the large signal voltage associated with source 340 of FIG. 3. The signal varies between a half wave retardation voltage and a negative voltage having a magnitude of the half wave retardation voltage. FIG. 5E illustrates an embodiment of a signal. Such a signal may be suitable for the small signal voltage associated with source 330 of FIG. 3. The signal varies between ground and one half of the half wave retardation voltage. The frequency of this signal is relatively high. As will be appreciated, the signals of FIGS. 5D and 5E may be subtracted (again, using the differential between the two voltages) to produce a signal similar to that of FIG. 5C.

Note that the pulse width and duty cycle for the square wave for the small signal and the large signal may be determined based on a large number of factors relating to the modulator, modulator assembly, and the surrounding system. For example, the high frequency pulse width and duty cycle may be set based on a data rate, coding efficiency, and thermal effects in both the modulator and recording medium in one embodiment or application of an embodiment. Similarly, the low frequency pulse width and duty cycle may be set based on a charge screening time constant in one embodiment. In one embodiment, the difference between the low frequency pulse width and the high frequency pulse width is approximately four orders of magnitude, but greater or lesser differences may be suitable in other embodiments. Similarly, differences in magnitude between the small and large signals may be greater or smaller depending on the embodiment and the application.

Figure 6:
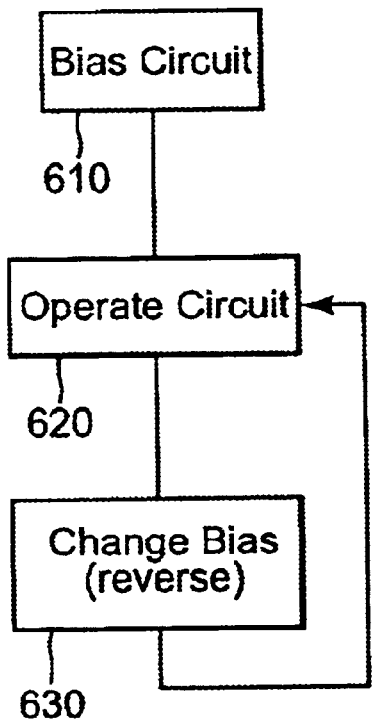
FIG. 6 illustrates a flow diagram of an embodiment of a method of driving an electro-optic modulator.

FIG. 6 illustrates a flow diagram of an embodiment of a method of driving an electro-optic modulator. The modulator is biased at block 610, setting the initial bias such that an electric field having a first polarity is applied. At block 620, the circuit is operated, resulting in application of a small signal voltage such as that of FIG. 5B and a modulation in the electric field applied to the modulator. At block 630, the bias on the circuit is changed, such that an electric field having a second polarity, opposite the first polarity, is applied. Then, the circuit is operated again at block 620, resulting in fast modulation of the electric field. Moreover, by switching polarities (biases), the materials used in the modulator may not undergo the effects of the charge screening problems described earlier.

Figure 7:
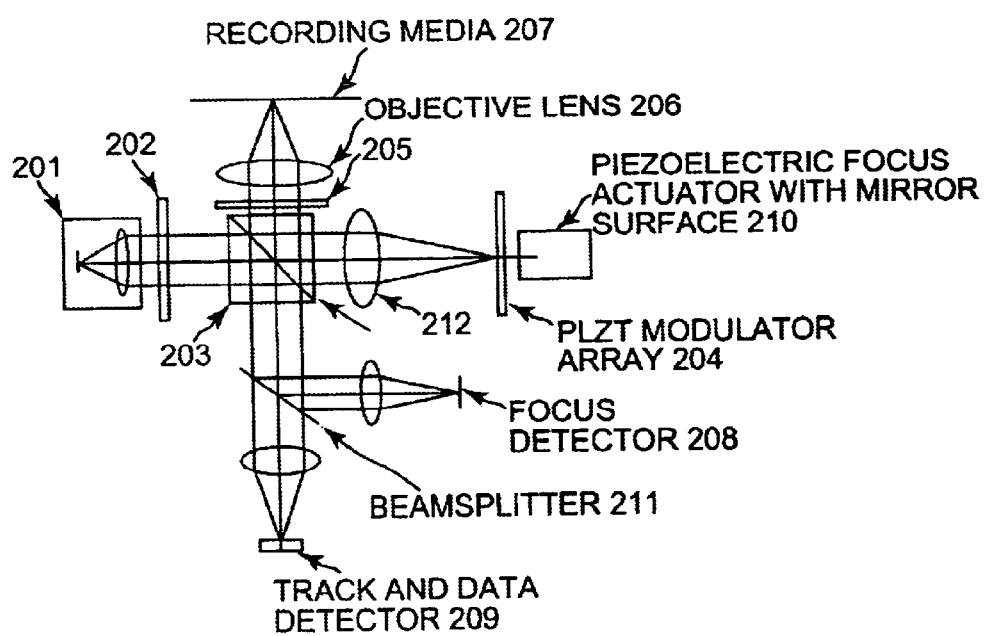
FIG. 7 illustrates an embodiment of an optical recording system.

Referring to FIG. 7, an embodiment of an optical recording system having an electro-optical modulator array is shown. This optical recording system may incorporate the method and apparatus of driving an electro-optic modulator. A light source 201 produces a collimated light beam which is sent through a computer generated hologram 202. In one embodiment, the computer generated hologram 202 generates a beam array having multiple diffraction limited light beams. These beams pass through beamsplitter 203 to a modulator array 204 and focus actuator 210. The multiple beams of the beam array are modulated by modulator array 204. Modulator array 204 is comprised of an electrode structure deposited onto a wafer or thin deposited layer of electro-optic ferroelectric ceramic (e.g., PLZT). The linearly polarized beams from polarizing beamsplitter 203 are reflected back by the focus actuator 210. Focus actuator 210 is comprised of a piezoelectric material with a mirror surface. These reflected, modulated beams are then routed by beamsplitter 203 to the recording media 207 via quarter wave plate 205 and objective lens 206. On readback, the data reflected from the illuminated media surface 207 is passed through the beamsplitter 203 to the focus detector 208 and the track and data detector 209 via a second beamsplitter 211. The focus detector 208 detects whether the light beam is in focus relative to the recording media 207. An electrical signal is generated which indicates the degree of focus. Track and data detector 209 is used to position the objective lens 206 so as to properly track the data recorded on media 207. A tracking signal is generated for this purpose. Furthermore, detector 209 generates an electrical digital signal corresponding to the reflected beams.

In one embodiment, modulator array 204 is operated in a reflective mode in which the optical beams pass twice through the thin film PLZT ferroelectric. A mirror is placed in close proximity to the rear of the modulator array 204. This mirror is driven along the optical axis by means of the piezoelectric actuator 210. The optical path from the light source 201, to the piezoelectric focus actuator 210, to recording media 207, and finally to the focus detector 208 and the track and data detector 209, is such that a slight positional change in the reflective surface of the mirror causes a focal change at the surface of the recording media 207. This positional change is measured by the detectors 208–209, thereby enabling a high bandwidth servo loop to be closed about the focal position.

It should be noted that in one embodiment of the present invention, the commonly used actuator (not shown) associated with the objective lens 206 is retained. This objective lens actuator is used to provide an offset along the optical axis for effecting a zero position adjustment. In one embodiment, the offset adjustment is achieved by placing a focusing lens 212 immediately in front of the modulator array 204. Positioning the focusing lens 212 produces the desired offset. Consequently, the requirement for dynamically moving the objective lens in the focus direction is eliminated. Furthermore, by implementing the focusing lens 212 in such a manner, the possibility of magnetic interference when focus actuators are used in conjunction with magnetically sensitive media (e.g., magneto-optic) or when magnetic effects are used in the tape support bearing structure is minimized. In one embodiment, rotational adjustment of hologram 202 and data detector array 204 about their optical axes, changes the track spacing that can be read from media 207. This rotational adjustment can be implemented to control the track spacing.

In an alternate embodiment (not shown), the piezoelectric focus actuator with mirror surface 210 is replaced with a mirror surface and the objective lens 206 is used to adjust the focus of the system. In such an embodiment, the objective lens 206 is moved along the path of the beam. Moreover, in such an embodiment, a second unmodulated beam may be utilized to illuminate focus, data and tracking detectors, and the second beam may be generated by using a beamsplitter, or other partially reflective device, positioned in the optical path taken by the light which initially enters the modulator. Similarly, in such an embodiment, clustering of the various components may be different, such as integrating various detectors or rearranging various components to facilitate a different layout. It will be appreciated that such an embodiment may achieve similar functionality to the illustrated embodiment.

In embodiments of the optical recording system, it will be appreciated that the method and apparatus for driving an electro-optic modulator may be used as part of the PLZT modulator array 204 for example.

U.S. Pat. No. 6,141,301 concerns an apparatus and method for dynamic tracking and focus in an optical tape system and is hereby incorporated herein by reference.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the blocks of FIG. 6 represent portions of a method which, in some embodiments, may be reordered or may be organized in parallel rather than in a linear or step-wise fashion. The present specification and figures are accordingly to be regarded as illustrative rather than restrictive.

What is claimed is:

1. In an optical storage system, an apparatus for focusing a light beam onto a recording medium, the apparatus comprising:

a modulator for modulating the light beam to produce a modulated light beam, the modulator modulated responsive to an electric field, the electric field varied between a half-wave retardation level and a predetermined minimal retardation level, the predetermined minimal retardation level approximately one-half of the half-wave retardation level;

an objective lens for focusing the modulated light beam onto the recording medium;

a focus detector for generating an electrical signal corresponding to a degree of focus of the modulated light beam in reference to the recording medium;

a beamsplitter for directing the modulated light beam to the objective lens and directing a reflected light beam from the recording medium to the focus detector; and a focus actuator placed in close proximity to the modulator, the actuator having a mirrored surface for reflecting the modulated light beam to the beamsplitter, wherein the focus actuator is moved in an optical axis responsive to the electrical signal generated by the focus detector.

2. The system of claim 1 wherein:

the modulator is configured such that the electric field of the modulator is produced by applying a first voltage to a first electrode of the modulator and a second voltage to a second electrode of the modulator, the first electrode positioned on the modulator diametrically opposite to the second electrode.

3. The system of claim 2 wherein:

the modulator is configured such that the first voltage and the second voltage are periodically switched between a first bias and a second bias, the first bias having the first voltage at ground potential and the second voltage varying between a half-wave retardation voltage level and a predetermined minimal retardation voltage level, the second bias having the second voltage at ground potential and the first voltage varying between a half-wave retardation voltage level and a predetermined minimal retardation voltage level.

4. The system of claim 2 wherein:

the modulator is configured such that the first voltage and the second voltage are periodically switched between a first bias and a second bias, the first bias having a positive differential between the first voltage and the second voltage, the second bias having a negative differential between the first voltage and the second voltage.

5. The system of claim 1 wherein the modulator includes an electro-optic component having an approximately quadratic electro-optic response formed from a material selected from one of the group of: PLZT, Lithium Tantalate, Lithium Niobate, and KDP;

and wherein the modulated light beam is produced by passing the light beam through the electro-optic component.

6. In an optical storage system, a method for focusing a light beam onto a recording medium, the method comprising:

modulating the light beam to produce a modulated light beam by using a modulator, the modulating performed by an electro-optic modulator, the electro-optic modulator controlled by an electric field, the electric field varied between a half-wave retardation level and a predetermined minimal retardation level, the predetermined minimal retardation level approximately one-half of the half-wave retardation level;

focusing the modulated light beam onto the recording medium by using an objective lens;

generating an electrical signal corresponding to a degree of focus of the modulated light beam in reference to the recording medium by using a focus detector;

directing the modulated light beam to the objective lens;

directing a reflected light beam from the recording medium to the focus detector; and moving a focus actuator placed in close proximity to the modulator, the actuator having a mirrored surface for reflecting the modulated light beam to a beamsplitter which directs the modulated light beam to the objective lens, wherein the focus actuator is moved in an optical axis responsive to the electrical signal generated by the focus detector.

7. The method of claim 6 wherein:

varying the electric field is accomplished by applying a first voltage to a first electrode of a modulator and applying a second voltage to a second electrode of the modulator, the first electrode positioned on the modulator diametrically opposite to the second electrode, the first voltage and the second voltage varied over time.

8. The method of claim 7 further comprising:

biasing the electric field of the modulator on a periodic basis, the biasing switched between a first bias and a second bias.

9. The method of claim 8 wherein:

the first bias having the first voltage at ground potential and the second voltage varying between a half-wave retardation voltage level and a predetermined minimal retardation voltage level, the second bias having the second voltage at ground potential and the first voltage varying between a half-wave retardation voltage level and a predetermined minimal retardation voltage level.

10. A modulator assembly comprising:

a first electrode;

a second electrode;

an electro-optic material, the electro-optic material having a first side and a second side, the second side opposite the first side, the electro-optic material coupled to the first electrode on the first side and to the second electrode on the second side; and a voltage source, the voltage source configured to generate a voltage differential between a first terminal and a second terminal, the voltage differential variable between a half wave retardation voltage level and a predetermined minimal retardation voltage level, the first terminal coupled to the first electrode, the second terminal coupled to the second electrode.

11. The modulator assembly of claim 10 wherein:

the electro-optic material is composed of one material having an approximately quadratic electro-optic response selected from the group of: PLZT, Lithium Tantalate, Lithium Niobate, and KDP.

12. The modulator assembly of claim 10 wherein:

the electro-optic material has a third side and a fourth side, the third side on a plane perpendicular to the first side and perpendicular to the second side, the fourth side on a plane perpendicular to the first side and perpendicular to the second side, the third side opposite the fourth side, the electro-optic material disposed to receive a light beam on the third side and pass the light beam through to the fourth side.

13. The modulator assembly of claim 12 further comprising:
a polarizer coupled to the electro-optic material on the fourth side; and wherein:
the polarizer disposed to receive the light beam after the light beam passes through the electro-optic material, the light beam having been retarded by the electro-optic material responsive to the voltage differential between the first and second electrodes.

14. The modulator assembly of claim 10 wherein:
the voltage source is configured to produce a first periodic voltage signal at a first frequency at the first terminal, the first signal varying between a half wave retardation voltage and a half wave negative retardation voltage in a square wave fashion,
the voltage source is configured to produce a second periodic voltage signal at a second frequency at the second terminal, the second signal having a magnitude varying between zero and approximately half of the half wave retardation voltage, the second signal having a polarity identical to the polarity of the first signal, the second signal varying in a square wave fashion.

15. The modulator assembly of claim 10 wherein:
the voltage source is configured to produce a first periodic voltage signal at a first frequency at the first terminal, the first signal varying between a half wave retardation voltage and a negative voltage level having a magnitude approximately half of the half wave retardation voltage in a square wave fashion,
the voltage source is configured to produce a second periodic voltage signal at a second frequency at the second terminal, the second signal varying between a first voltage and a second voltage in a square wave fashion, the second frequency higher than the first frequency, the first voltage is a zero voltage and the second voltage is a positive voltage level approximately half of the half wave retardation voltage.

16. A method of driving a modulator comprising:
varying a magnitude of an electric field applied to the modulator between a half wave retardation level and a predetermined minimal retardation level, the predetermined minimal retardation level approximately one half of the half wave retardation level.

17. The method of claim 16 further comprising:
varying a polarity of the electric field at a low frequency; and wherein varying the magnitude is performed at a high frequency.

18. The method of claim 17 further comprising:
passing a light beam through the modulator; and
passing the light beam through a polarizer after passing the light beam through the modulator.

19. The method of claim 18 wherein:
the modulator is composed of a material having an approximately quadratic electro-optic response selected from the group of: PLZT, Lithium Tantalate, Lithium Niobate, and KDP.

20. The method of claim 19 further comprising:
passing a light beam through the modulator, the modulator retarding the light beam responsive to the electric field; and
blocking the light beam from passing through a polarizer after passing the light beam through the modulator in response to the variation between a polarization of the light beam and a polarization angle of the polarizer.

21. An apparatus for driving a modulator comprising:
magnitude variation means for varying at a high frequency a magnitude of an electric field applied to the modulator between a half wave retardation level and a predetermined minimal retardation level, the predetermined minimal retardation level approximately one half of the half wave retardation level; and
polarity variation means for varying a polarity of the electric field at a low frequency.

22. The apparatus of claim 21 wherein:
the modulator configured to transmit a light beam through the modulator; and
a polarizer coupled to the modulator to receive the light beam and transmit the light beam.

23. In an optical storage system, an apparatus for focusing a light beam onto a recording medium, the apparatus comprising:
a modulator coupled to receive the light beam to and produce a modulated light beam, the modulator modulated responsive to an electric field, the electric field varied between a half-wave retardation level and a predetermined minimal retardation level, the predetermined minimal retardation level approximately one-half of the half-wave retardation level;
an objective lens coupled to receive the modulated light beam and coupled to focus the modulated light beam onto the recording medium;
a focus detector coupled to receive the modulated light beam and configured to generate an electrical signal corresponding to a degree of focus of the modulated light beam in reference to the recording medium;
a beamsplitter coupled to receive the modulated light beam and configured to direct the modulated light beam to the objective lens and direct a reflected light beam from the recording medium to the focus detector; and
a focus actuator placed in close proximity to the modulator, the actuator having a ITS mirrored surface for reflecting the modulated light beam to the beamsplitter, wherein the focus actuator is moved in an optical axis responsive to the electrical signal generated by the focus detector.

24. The apparatus of claim 23 wherein:
the modulator is configured such that the electric field of the modulator is produced by applying a first voltage to a first electrode of the modulator and a second voltage to a second electrode of the modulator, the first electrode positioned on the modulator diametrically opposite to the second electrode.

25. The apparatus of claim 24 wherein:
the modulator is configured such that the first voltage and the second voltage are periodically switched between a first bias and a second bias, the first bias having a positive differential between the first voltage and the second voltage, the second bias having a negative differential between the first voltage and the second voltage.

26. The apparatus of claim 25 wherein the modulator includes an electro-optic component having an approximately quadratic electro-optic response formed from a material selected from one of the group of: PLZT, Lithium Tantalate, Lithium Niobate, and KDP;
and wherein the modulated light beam is produced by passing the light beam through the electro-optic component.

27. In an optical storage system, an apparatus for focusing a light beam onto a recording medium, the apparatus comprising:

a modulator coupled to receive the light beam to produce a modulated light beam, the modulator modulated responsive to an electric field, the electric field varied between a half-wave retardation level and a predetermined minimal retardation level, the predetermined minimal retardation level approximately one-half of the half-wave retardation level;

an objective lens coupled to receive the modulated light beam and coupled to focus the modulated light beam onto the recording medium;

a focus detector coupled to receive the modulated light beam and configured to generate an electrical signal corresponding to a degree of focus of the modulated light beam in reference to the recording medium;

a beamsplitter coupled to receive the modulated light beam and configured to direct the modulated light beam to the objective lens and direct a reflected light beam from the recording medium to the focus detector;

a mirrored surface coupled to the modulator in a position suitable to reflect the modulated light beam to the beamsplitter; and a focus actuator coupled to the objective lens wherein the focus actuator is moved with the objective lens in an optical axis responsive to the electrical signal generated by the focus detector.

28. The apparatus of claim 27 wherein:

the modulator is configured such that the electric field of the modulator is produced by applying a first voltage to a first electrode of the modulator and a second voltage to a second electrode of the modulator, the first electrode positioned on the modulator diametrically opposite to the second electrode.

29. The apparatus of claim 28 wherein:

the modulator is configured such that the first voltage and the second voltage are periodically switched between a first bias and a second bias, the first bias having a positive differential between the first voltage and the second voltage, the second bias having a negative differential between the first voltage and the second voltage.

30. The apparatus of claim 29 wherein:

the modulator includes an electro-optic component having an approximately quadratic electro-optic response formed from a material selected from one of the group of: PLZT, Lithium Tantalate, Lithium Niobate, and KDP;

and wherein the modulated light beam is produced by passing the light beam through the electro-optic component.

31. In an optical storage system, an apparatus for focusing a light beam onto a recording medium, the apparatus comprising:

a modulator for modulating the light beam to produce a modulated light beam, the modulator modulated responsive to an electric field, the electric field varied between a half-wave retardation level and a predetermined minimal retardation level, the predetermined minimal retardation level approximately one-half of the half-wave retardation level;

an objective lens for focusing the modulated light beam onto the recording medium;

a focus detector for generating an electrical signal corresponding to a degree of focus of the modulated light beam in reference to the recording medium;

a beamsplitter for directing the modulated light beam to the objective lens and directing a reflected light beam from the recording medium to the focus detector; and a focus actuator coupled to the objective lens, for moving the objective lens in an optical axis responsive to the electrical signal generated by the focus detector.

32. The apparatus of claim 31 wherein:

the modulator is configured such that the electric field of the modulator is produced by applying a first voltage to a first electrode of the modulator and a second voltage to a second electrode of the modulator, the first electrode positioned on the modulator diametrically opposite to the second electrode.

33. The apparatus of claim 32 wherein:

the modulator is configured such that the first voltage and the second voltage are periodically switched between a first bias and a second bias, the first bias having a positive differential between the first voltage and the second voltage, the second bias having a negative differential between the first voltage and the second voltage.

34. The apparatus of claim 33 wherein:

the modulator includes an electro-optic component formed from a material having an approximately quadratic electro-optic response selected from one of the group of: PLZT, Lithium Tantalate, Lithium Niobate, and KDP;

and wherein the modulated light beam is produced by passing the light beam through the electro-optic component.

* * * * *